(12) United States Patent
Graves et al.

(10) Patent No.: US 8,549,395 B2
(45) Date of Patent: Oct. 1, 2013

(54) METHOD AND SYSTEM FOR TRANSFORMING AN INTEGRATED WEBPAGE

(75) Inventors: Jason Graves, Austin, TX (US); Ben Haley, Austin, TX (US)

(73) Assignee: CA, Inc., Islandia, NY (US)

( * ) Notice: Subject to any disclaimer, the term of this patent is extended or adjusted under 35 U.S.C. 154(b) by 525 days.

(21) Appl. No.: 12/639,854

(22) Filed: Dec. 16, 2009

(65) Prior Publication Data

US 2011/0145694 A1  Jun. 16, 2011

(51) Int. Cl.
*G06F 17/00* (2006.01)

(52) U.S. Cl.
USPC .......................................... 715/234; 715/249

(58) Field of Classification Search
USPC ................... 715/234, 249, 238, 200
See application file for complete search history.

(56) References Cited

U.S. PATENT DOCUMENTS

| | | | |
|---|---|---|---|
| 6,993,559 B2* | 1/2006 | Jilk et al. | 709/206 |
| 7,747,782 B2* | 6/2010 | Hunt et al. | 709/246 |
| 2002/0116416 A1* | 8/2002 | Tesch et al. | 707/516 |
| 2003/0126556 A1* | 7/2003 | Soetarman et al. | 715/513 |
| 2010/0235473 A1* | 9/2010 | Koren et al. | 709/219 |

* cited by examiner

*Primary Examiner* — Manglesh M Patel
(74) *Attorney, Agent, or Firm* — Baker Botts L.L.P.

(57) ABSTRACT

A method and system for transforming an integrated webpage into native text and image representations. A webpage containing an embedded object is loaded into a browser. A portable text representation of an image of the embedded object is captured by invoking the embedded object to rasterize itself. The portable text representation is then streamed to a web server and converted to a native image representation. A URL is generated for the native image representation and the embedded object on the integrated webpage is replaced with its native image representation.

23 Claims, 9 Drawing Sheets

METHOD AND SYSTEM FOR TRANSFORMING AN INTEGRATED WEBPAGE

FIELD

This invention relates in general to the field of webpages, and more particularly to a method and system for transforming a webpage containing an embedded object into text and image representations for use in a wide variety of applications.

BACKGROUND OF THE INVENTION

Embedded objects are increasingly used on webpages to enhance the interface capabilities, functionalities, and interactive control provided to users. These technologies allow users to interact with and within the webpage and provide developers with a rich set of tools to dynamically update the webpage interface. Embedded objects, such as plug-ins, are often used to obtain information from a user or to visually present information in an interactive manner. Examples of use include animation in a web browser and motion graphics—many embedded objects present dynamic visual images that may be manipulated by the user.

The term embedded objects includes, but is not limited to, internet browser plug-ins such as Adobe Flash, Microsoft Silverlight, ActiveX controls, Java applets, and 3DMLW. Further, there may be various types of embedded objects integrated throughout a single webpage to enhance the user's experience. The term "webpage" refers to any document or resource of information that is suitable for the World Wide Web and can be accessed through a web browser and displayed on a computer screen. This information is usually presented in HTML or XHTML formats. The term "integrated webpage" refers to a webpage containing at least one embedded object. Additionally, the term "native" refers to any object in a format inherently supported by a web browser.

Embedded objects are often implemented as plug-ins in a webpage and are able to operate independent of a web server. Often data updates and interface presentation modifications occur without requiring webpage regeneration and without web server interaction. In this case, the user interaction with the embedded object remains internal to the embedded object without being recognized by the webpage server and the state of the embedded object does not have to be maintained on the server.

Users often need to capture the visual representation of an integrated webpage including the changes and modifications in the image representation of the embedded object that occur as a result of the user's input. This may occur in the context of storing, printing, capturing or converting the webpage as it is presented to the user. However, because user interaction with the embedded object is conducted internally within the embedded object and not recognized by the webpage server, users often cannot capture the current visual presentation of the integrated webpage. For example, when a user wishes to print an integrated webpage, the web browser converts the embedded objects to native formats. The browser essentially performs a screen capture of the embedded object and only the currently visible portion of the object can be captured. This capture also contains unwanted artifacts such as scroll bars required for interactive use. The capture is based on the display size so it is often too large for printing and results in truncation of portions of the image.

Further, in many contexts it is also required that users be able to print, capture, or save an entire webpage as it is coded regardless of the actual visual presentation on the user's monitor. It is also valuable for users to be able to capture the visual representation of a webpage without having to instantiate that webpage in a web browser. In both of these cases, the user may wish to capture, print, or store the integrated webpage as it has been coded and reflecting the changes to the embedded object regardless of the webpage's presentation or whether the webpage has been loaded into a web browser at all.

Existing solutions for capturing the visual representation of an integrated webpage include using a screen capture or extending the webpage markup language to include the embedded object. Yet, neither of these solutions provides an efficient and reusable method of capturing the current visual representation of an integrated webpage as it appears to the user or as it has been coded.

The screen capture method utilizes the screen capture function on a computer to take a picture of the visible items displayed on the computer monitor and typically saves the image as a bitmap image. While this method does capture the current image representation of the integrated webpage, it also captures the entire visible display making it necessary for the user to alter or crop the bitmap image to obtain an accurate representation of the webpage. Each screen capture image requires a unique alteration in order to capture the desired image—the integrated webpage as presented to the user. And when the web page is larger than the screen, multiple images must be captured and edited together. This labor-intensive process, requiring multiple steps and actions by the user, often results in a poor quality and inaccurate bitmap image of the webpage and is difficult to automate. Also, this method requires the web server to regenerate the integrated webpage often resulting in an inaccurate image replacement.

Another solution, extending the markup language (most often HTML or XML) to include the embedded object, attempts to replace the use of embedded objects with new objects that are native to the selected markup language. For example, HTML 5 introduces the canvas object as an alternative for Flash and Silverlight. But extending a markup language requires comprehensive programmatic change and web browser upgrades—without which the embedded objects are not supported. Further, when utilizing this approach to print an integrated webpage, the webpage may regenerate and the HTML converted embedded object is reloaded and printed in its default state.

Another option is to create "printer-friendly" alternative pages. In this case, the server builds "printer-friendly" pages using native objects instead of embedded objects. In the context of HTML or XML, native may refer to such image representations as, for example, JPEGs, PNGs, and GIFs. This approach requires the web server to know the state of the client presentation to produce a native image instead of the embedded object. There are a number of options for transmitting the embedded object's state; for example, some solutions utilize features such as Fat URLS, hidden fields, and cookies for maintaining state. However, this approach requires the web server to create two implementations to render graphics; one for the page with embedded objects and the other for the page with native objects.

SUMMARY OF THE INVENTION

Therefore a need has arisen for a reusable and user-independent method and system for accurately capturing the current image representation of an integrated webpage. In accordance with the disclosed subject matter, a method and system for transforming an integrated webpage into native text and image representations is provided that substantially reduces the disadvantages and problems associated with previously developed webpage image capturing, storing, and printing systems.

The disclosed subject matter provides a reusable method and system for transforming an integrated webpage into native text and image representations that captures the state of the webpage at the time of conversion. This method leverages native capabilities of the embedded objects to capture their current image representation to produce a webpage containing only browser-native objects. A portable text representation of each embedded object is captured and streamed to the server. The server converts the portable text representations to image representations which may then be stored on the web server. The web server generates URLs for each image and the browser may either replace embedded objects with the images (using URLs) or the web server may regenerate the integrated web page using the native image representations.

Additionally, the disclosed subject matter may utilize an in-memory browser document object model (DOM) to load and transform an integrated webpage without requiring client interaction. The term "in-memory" is used to indicate that the object is implemented on a server. In process, a webpage containing an embedded object is loaded into a browser emulator on the server as an in-memory browser document object model. The emulator converts the embedded objects into a portable text representation and streams the portable text representation to the server. The server converts the portable text representation to a native image representation which is stored on the web server and the web server generates URLs for each image. The browser emulator may either replace embedded objects with the images (using URLs) or the web server may regenerate the integrated web page using the native image representations. The final web page may then be streamed to the destination (PDF generator, file, email . . . ). Transforming the embedded object into a native object image representation supported by a web browser allows users to print, store, and convert an accurate and current visual representation of the integrated webpage.

A technical advantage of an embodiment of the present disclosure is the ability to leverage the inherent ability of embedded objects to rasterize themselves into a portable text representation which can then be converted to native image objects. This process ensures the captured portable text representation reflects an accurate image representation of the embedded object when requested. Further, it is not required that the state of the embedded object be sent to the server because the image of the embedded object is captured by the browser.

A technical advantage of creating an in-memory browser document object model is the ability to implement any programming logic the web browser can support independent from the webpage server. Therefore, the disclosed subject matter will operate on any web browser or web browser platform.

Another technical advantage of the disclosed subject matter is the ability to print an integrated webpage without requiring the user to load the webpage into a web browser. The selected integrated webpage may be stored on the web server itself. Thus, the process of transforming an integrated webpage into native text and image representations may be automated, user-independent, and browser independent. Because the integrated webpage may be captured as a document object model in-memory on a server, the disclosed subject matter may operate independent of a web browser.

Another technical advantage of the disclosed subject matter is the ability to capture the image of the integrated webpage as it has been coded and reflecting the changes to the embedded object regardless of the webpage's presentation in a web browser or whether the webpage has been loaded into a web browser at all.

Yet another technical advantage of the disclosed subject matter is the conversion of the integrated webpage to native text and image representations allows the created page to be converted to any other format that does not support the embedded objects.

Other technical advantages will be readily apparent to one skilled in the art from the following FIGUREs, description, and claims.

BRIEF DESCRIPTIONS OF THE DRAWINGS

For a more complete understanding of the disclosed subject matter and advantages thereof, reference is now made to the following description taken in conjunction with the accompanying drawings in which like reference numerals indicate like features and wherein.

DETAILED DESCRIPTION OF THE SPECIFIC EMBODIMENTS

The following description is not to be taken in a limiting sense, but is made for the purpose of describing the general principles of the present disclosure. The scope of the present disclosure should be determined with reference to the claims. And although described with reference to transforming an ActiveX control, specifically a Flash plug-in, embedded on a webpage and capturing the Base64 image data of that Flash plug-in, a person skilled in the art could apply the principles discussed herein to any embedded object, such as Embed technology, on a webpage and capturing any portable text representation of the image of the embedded object. Further, although the described integrated webpages are HTML pages, the disclosed subject matter is applicable to XHTML, XML, and any other markup language used by computers to communicate with each other over a network. Preferred embodiments of the disclosed subject matter are illustrated in the FIGUREs, like numerals being used to refer to like and corresponding parts of the various drawings.

The systems and methods described herein are designed to allow a user to transform a webpage containing an embedded object into native text and image representations. The term "integrated webpage" refers to a webpage containing at least one embedded object. In particular, the disclosed subject matter allows a user to transform the visual representation of an integrated webpage by loading the webpage into a browser, capturing a portable text representation of the image of the embedded object, and converting that portable text representation into native objects on a web server. The term "native" refers to any object in a format inherently supported by a web browser. In the context of HTML or XML, native may refer to such image representations as, for example, JPEGs, PNGs, and GIFs. Further, by utilizing an in-memory browser document object model, the disclosed subject matter provides a reusable and user-independent method and system for transforming an integrated webpage. The term "in-memory" is used to indicate that the object is implemented on a server.

In the context of this document, a "memory," "recording medium" and "data store" can be any means that contains, stores, communicates, propagates, or transports the program and/or data for use by or in conjunction with an instruction execution system, apparatus or device. Memory, recording medium and data store can be, but are not limited to, an electronic, magnetic, optical, electromagnetic, infrared or semiconductor system, apparatus or device. Memory, recording medium and data store also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
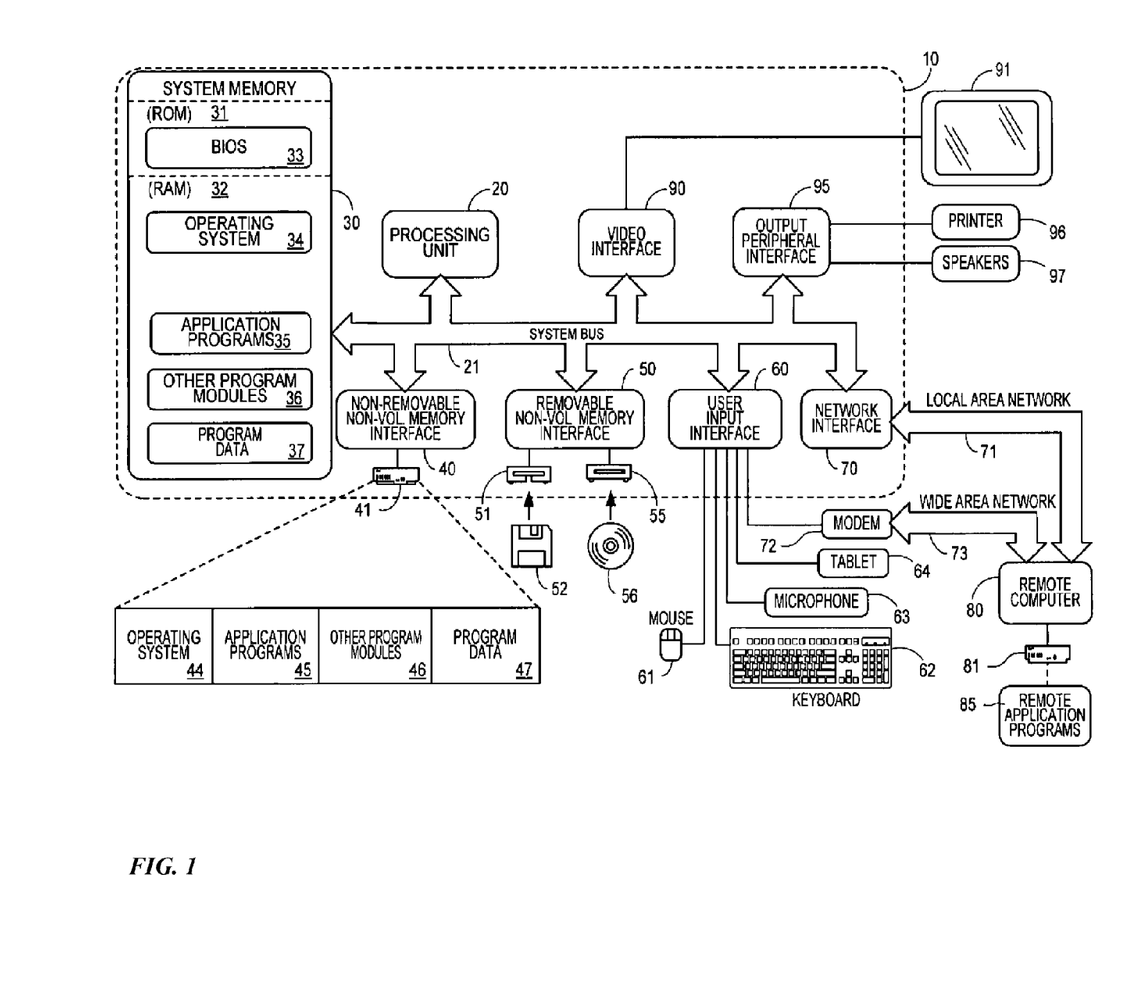
FIG. 1 is a block drawing of an exemplary web server system architecture that supports the claimed subject matter.

FIG. 1 is a block drawing of an exemplary computing environment 100 that supports the claimed subject matter. FIG. 1 illustrates an example of a suitable computing system environment 100 which may serve as a web server and on which the disclosed subject matter may be implemented. The computing system environment 100 is only one example of a suitable computing environment and is not intended to suggest any limitation as to the scope of use or functionality of the disclosed subject matter. Neither should the computing environment 100 be interpreted as having any dependency or requirement relating to any one or combination of components illustrated in the exemplary operating environment 100.

The disclosed subject matter is operational with numerous other general purpose or special purpose computing system environments or configurations that are capable of providing the services of a web server. Examples of well known computing systems, environments, and/or configurations that may be suitable for use with the disclosed subject matter include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosed subject matter may be described in the general context of computer-executable instructions, such as program modules, being executed by a computer. Generally, program modules include routines, programs, objects, components, data structures, etc. that perform particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

With reference to FIG. 1, an exemplary system within a computing environment for implementing the disclosed subject matter includes a general purpose computing device serving as a web server in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules 46 and program data 47. Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 94 or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the presently disclosed subject matter, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN networking environment, the computer 10 is connected to the LAN 71 through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the disclosed subject matter will be described with reference to acts and symbolic representations of operations that are performed by one or more computers operating as web servers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the disclosed subject matter is being described in the foregoing context, it is not meant to be limiting as those of skill in the art will appreciate that several of the acts and operation described hereinafter may also be implemented in hardware.

Figure 2:
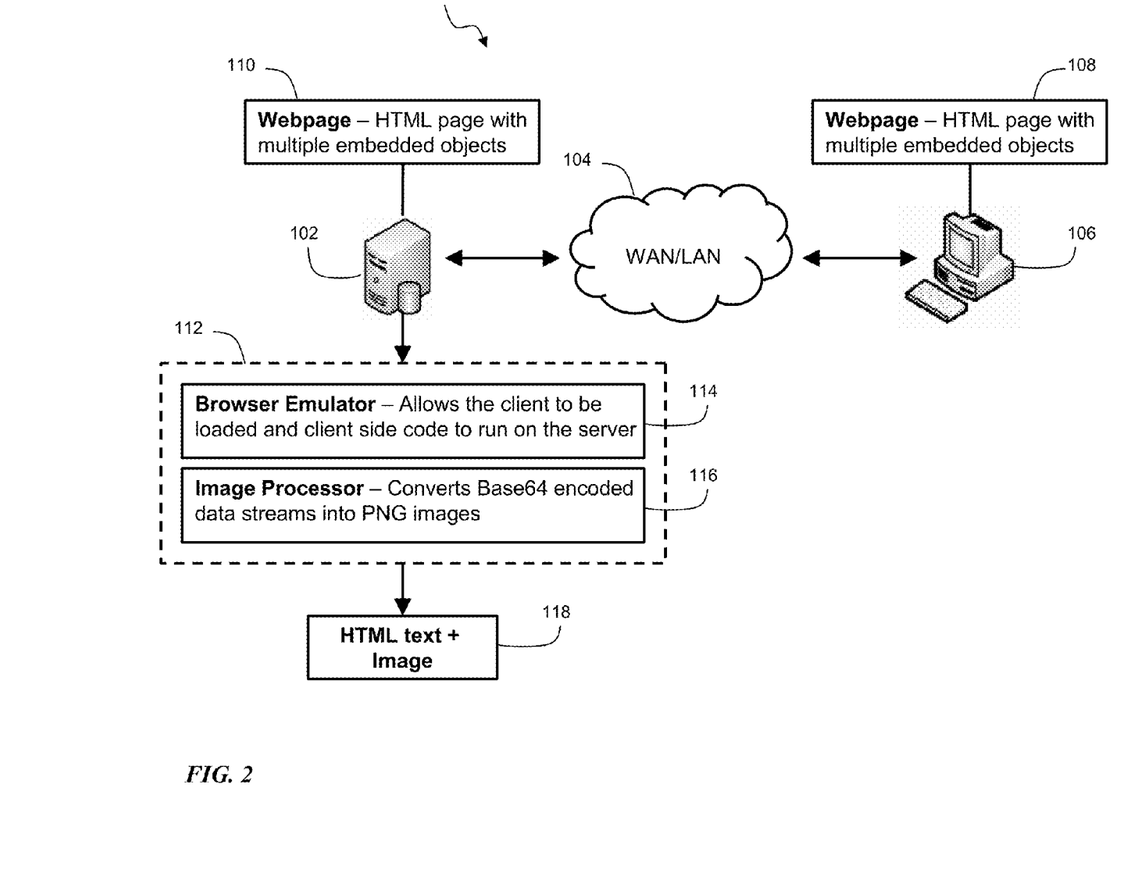
FIG. 2 is a diagram illustrating a system in accordance with the disclosed subject matter.

FIG. 2 is a diagram illustrating a system in accordance with the disclosed subject matter. Webpage 108 is a typical HTML page with multiple embedded objects that has been provided by web server 102 to client computer 106 over HTTP network 104. Webpage 110 is stored on web server 102 and may be an internally generated HTML page with multiple embedded objects. Webpage transformer 112 is stored on web server 102 and comprises browser emulator object 114 and image processor service 116 for transforming the integrated webpage into HTML text and image representations 118.

The methods and functions disclosed herein are not meant to be limiting and may be implemented utilizing various programming frameworks and methods. As described, the functionalities of the disclosed subject matter represented by webpage transformer 112 may be implemented using browser emulator 114 and image processor service 116. An advantage of the described embodiment is the implementation efficiency of the image processor as a service separate from the browser emulator. However, the disclosed subject matter may be implemented as one object or multiple objects on a server such as a web server or translation server. Thus, the functionalities as listed in the claims and described as provided by webpage transformer 112 and performed by browser emulator 114 and image processor 116, may be implemented using a variety of programming frameworks. Often the image processors are the same plug-ins used by client-side browsers to render data and allow for client interaction. Additionally, the described methods may be implemented as a component on the client's web browser. The methods described are meant to be illustrative of one embodiment of performing the functions of the disclosed subject matter.

Webpage 108 and webpage 110 represent two different embodiments of a webpage. Webpage 108 on client computer 106 has been loaded into a web browser by a user. When the user requests that the image of webpage 108 be captured, the browser on client computer 106 requests the current image representation from each embedded object. These objects must have the ability to transform their current graphical presentation to a neutral format such as a Base64 encoding. The browser streams this representation to server 102 over WAN/LAN 104. Server 102 converts the neutral format to a browser-native format such as PNG, JPEG or GIF and caches the images and server 102 returns URLs for the images. Webpage 108 may then replace the current embedded objects with the browser-native images or can request that a new page be generated with the browser-native images. The new webpage may then be streamed back to the client or run through another conversion such as translation to Adobe Acrobat (PDF) or Microsoft Word format or the page could be further processed such as being sent to a printer or emailed to a user. Thus, the state of the embedded object need not be sent to the server because the image of the embedded object may be captured as a portable text representation in the browser.

Webpage 110 has been loaded on server 102 and is transformed according to webpage transformer 112. In this embodiment, the client computer does not perform the translation of the embedded object to native text, but instead webpage transformer 112 is created to perform the translation. Webpage transformer 112 instantiates browser emulator 114 to load webpage 110 into an in-memory browser document object model. Browser emulator 114 must detect when webpage 110 has completed loading. Browser emulator 114 then requests webpage 110 be processed in the same manner that webpage 108 is processed on client computer 106.

As shown, webpage 108 and webpage 110 are HTML pages, but alternatively may be XHTML pages or XML pages. Web server 102 as shown is an HTTP server, but may also be a SOAP server.

Alternatively, webpage 108 and webpage 110 may contain one or multiple embedded objects or varying types of embedded objects.

Figure 3:
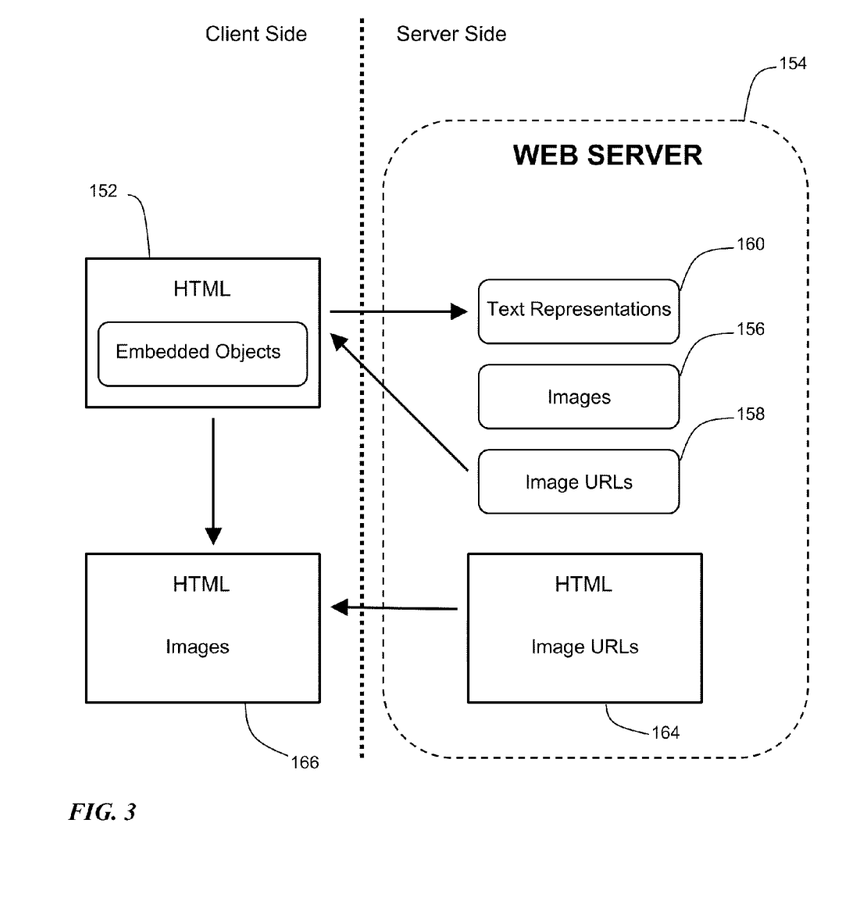
FIG. 3 is a diagram illustrating the functional process of an embodiment of the disclosed subject matter.

FIG. 3 is a diagram illustrating the process of transforming an integrated webpage into HTML text and image representations in accordance with the disclosed subject matter. Integrated webpage 152 contains an embedded object and is transformed into HTML webpage 166 composed entirely of HTML text and image representations providing an accurate visual representation of integrated webpage 152 at the time the disclosed process was initiated.

Integrated webpage 152 represents the visual image the user sees in his/her web browser or the webpage internally generated by web server 154 according to an automated process. When the disclosed process is initiated, a script (Javascript, ActionScript, ECMAScript, Jscript) is invoked in the browser which asks each embedded object to rasterize itself into a text representation format such as Base64. This set of rasterized images is then streamed to web server 154 as text representations 160. Web server 154 converts the data stream into a set of browser-native images 156 and creates a set of URLs 158 that can be used to retrieve browser-native images 156. Set of URLs 158 is returned to the browser in an Internet-friendly format such as XML, JSON or Protocol Buffers. The client side browser may then replace the embedded objects using set of URLs 158 returned or may request the page be regenerated as regenerated page 164 using the embedded images and streamed to client as HTML text and native images 166. Alternatively, the page can be regenerated as regenerated page 164 and sent to another processing stage such as Adobe Acrobat or Microsoft Word conversion.

Figure 4:
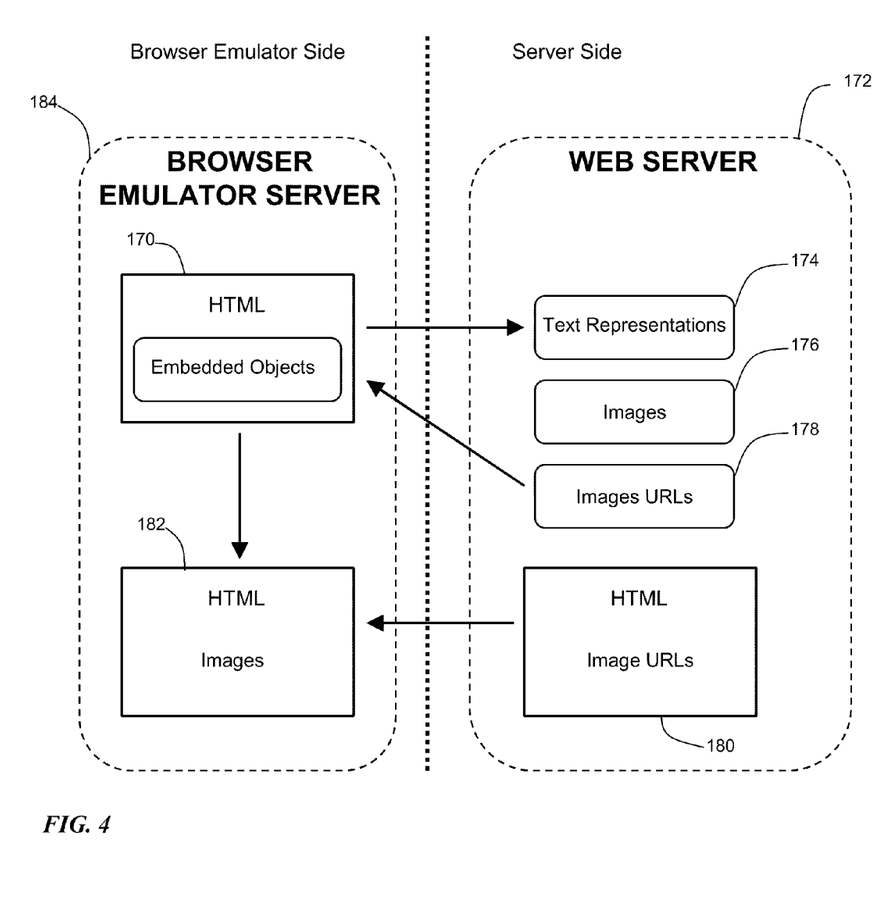
FIG. 4 is a diagram illustrating the functional process of an embodiment of the disclosure subject matter utilizing a browser emulator.

FIG. 4 is a diagram illustrating the process of transforming an integrated webpage into HTML text and image representations utilizing a browser emulator to transform the integrated webpage. Browser emulator 184 is implemented as an object on a server and acts as an in-memory web browser for integrated webpage 170. Browser emulator 184 may be instantiated by a call made to web server 172 by the user or automatically initiated by another process, such as a scheduled report generator. Once instantiated, browser emulator 184 loads integrated webpage 170 into an in-memory document object. The image data of the embedded object on webpage 170 is captured as portable text representation 174. Portable text representation 174 may be captured by invoking the embedded object to rasterize itself into a portable text representation of its image. The image data of portable text representation 174 is then converted into an image representation and stored as image 176 on web server 172. Web server 172 generates URL 178 for each image 176. Browser emulator 184 may then retrieve the list of image URLs 178 and replace the embedded objects on webpage 170 with the image representations 176 resulting in HTML webpage 182. HTML webpage 182 may then be exported by browser emulator 184 as HTML text and native images. Alternatively, web server 172 may regenerate the web page using URL 178 for the images to create a web page containing native objects 180.

Because the selected webpage may be loaded into an in-memory browser document object model, the disclosed subject matter may operate automatically and independent from user interaction. For example, a pre-selected webpage may be loaded automatically, at a specified time or frequency, into an in-memory browser DOM and the resulting HTML text exported to the client as native text and image representations on a predetermined schedule. Thus, the users need not instantiate a web browser to initiate or complete the process.

The disclosed subject matter provides a reusable and user-independent system and method for capturing the image representation of an integrated webpage utilizing the inherent and public ability of an embedded object to rasterize itself as a portable text representation. This may be accomplished by invoking a print method of the embedded object to capture the Base64 image data of the embedded object.

However, the methods and functions disclosed herein are not meant to be limiting and may be implemented utilizing various programming frameworks and methods. Further, the public methods of the embedded object used to capture the image data of the embedded object may vary according to the specific embedded object. The methods described are meant to be illustrative of one embodiment of performing the functions of the disclosed subject matter.

Figure 5:
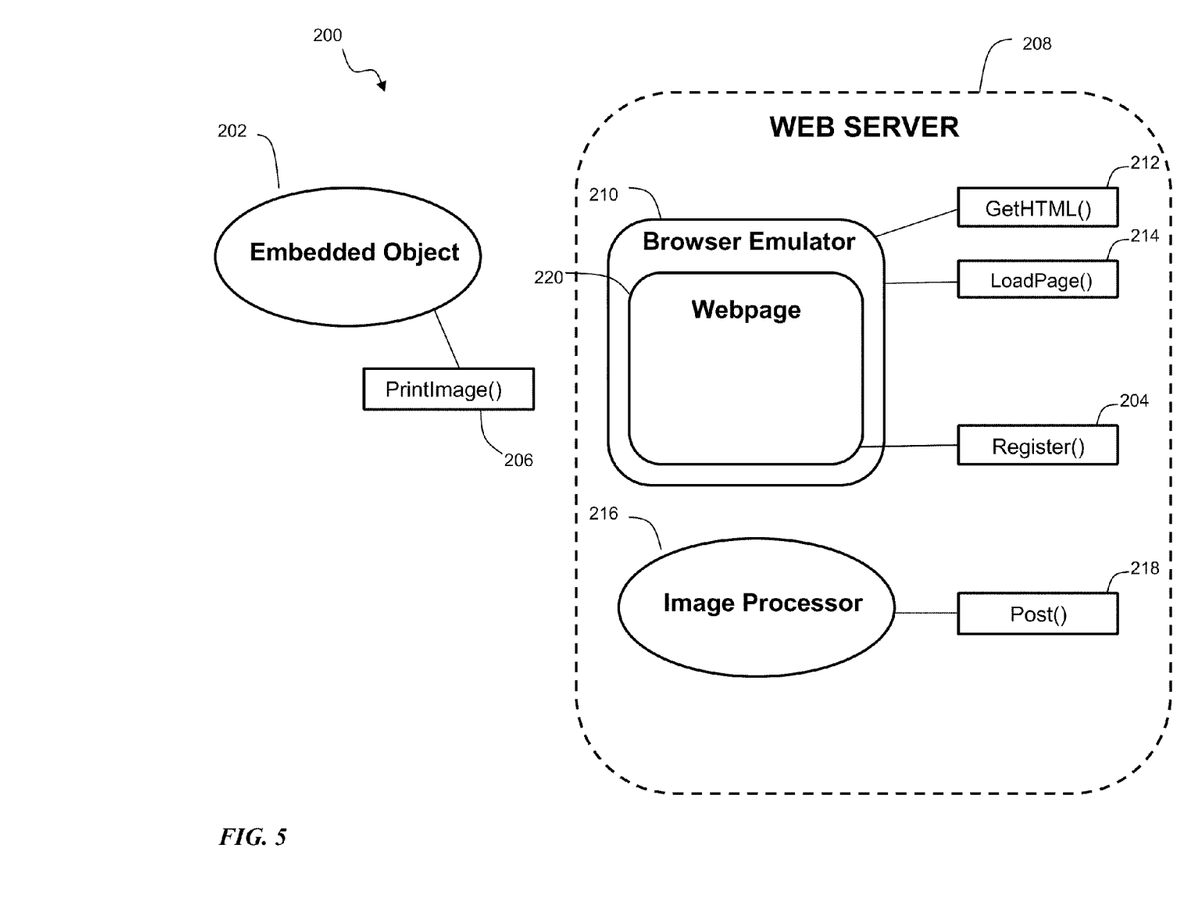
FIG. 5 is diagram illustrating the implementation framework of one embodiment of the present disclosure.

FIG. 5 illustrates an implementation framework of one embodiment of the present disclosure utilizing a browser emulator object and an image processor service both implemented on a web server.

As shown in FIG. 5, embedded object 202 is an embedded object integrated on a webpage. Embedded object 202 calls the public method Register( ) 204 on webpage 220 when the object is created. Register( ) 204 is a public method on webpage 220 called by embedded object 202 signifying that the image data of embedded object 202 has been loaded on webpage 220 and is ready to be retrieved and printed. PrintImage( ) 206 is an exposed method of embedded object 202 that will be called to provide a portable text representation of the image of embedded object 202. Web server 208 may be an HTTP server. Browser emulator 210 is an object implemented on web server 208 and exposes the methods GetHTML( ) 212 and LoadPage( ) 214. In operation LoadPage( ) 214 loads the webpage into an in-memory browser document object model, polls the in-memory browser document object model to ensure embedded object 202 has called Register( ) 204, and converts the embedded object to image data (here via image processor 216). GetHTML( ) 212 replaces the embedded objects with the image representations stored on the server (via image processor 216) and exposes the finished HTML text and native images to the client. Image processor 216 converts the portable text representation of embedded object 202 to an image representation, stores the image representation on web server 208 and returns the location of those image representations to browser emulator 210. In operation, web server 208 calls Post( ) 218 which sends all portable text representation data and associated embedded object identifiers to image processor 216. Image processor 216 then converts the portable text representation data into image representations and a list of uniquely identified image representation URLs and associated embedded object identifiers are returned to the integrated webpage loaded as an in-memory browser document object model.

An advantage of the described embodiment is the implementation efficiency of the image processor as a service separate from the browser emulator. However, one skilled in the art would recognize that the image processor may also be a component of the browser emulator object.

Figure 6:
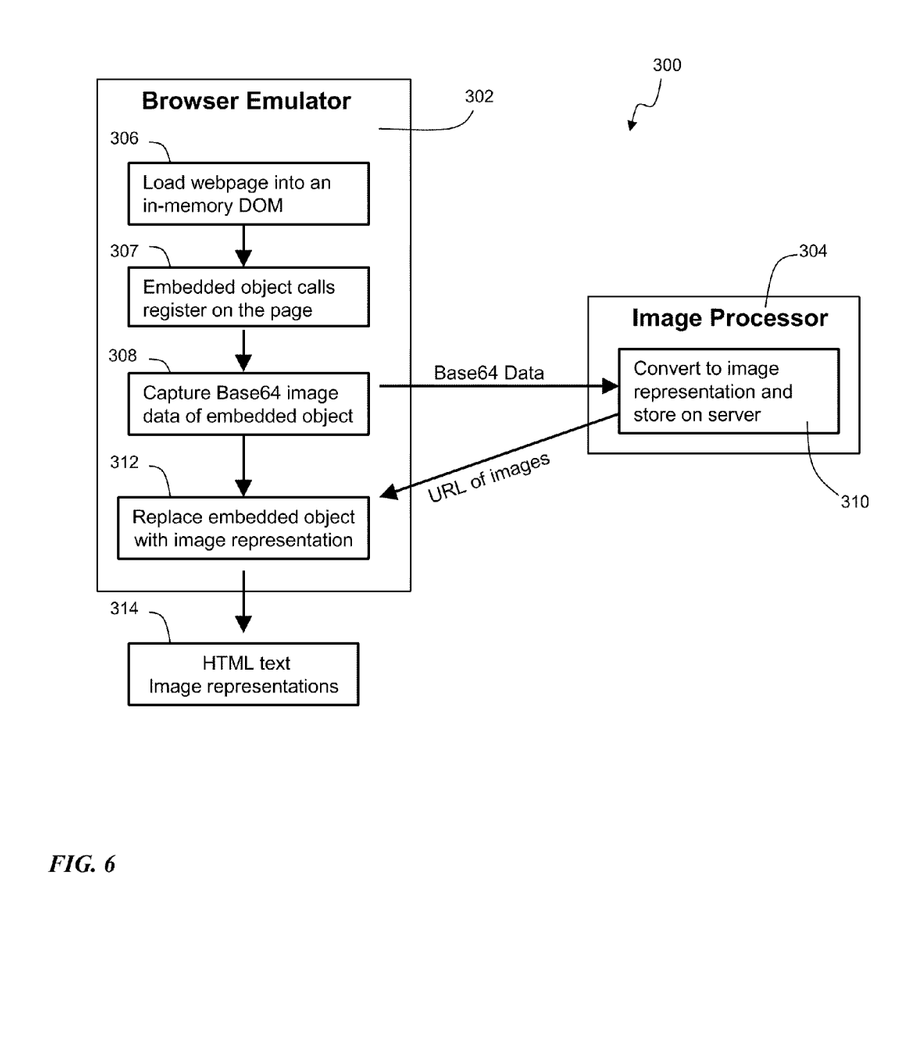
FIG. 6 is a diagram illustrating the functional process of an embodiment of the disclosed subject matter.

FIG. 6 illustrates the functional relationships and process flow of an embodiment of the disclosed subject matter utilizing a browser emulator object and an image processor service both implemented on a web server. Browser emulator 302 is an in-memory browser implemented on a web server and image processor 304 is a service implemented on a web server. However, browser emulator 302 and image processor 304 do not have run on a web server and instead may be implemented on another server such as a translation server.

Browser emulator 302 may be instantiated automatically or according to a call made by a user to capture the visual representation of an integrated webpage. In step 306 browser emulator 302 loads the selected webpage into an in-memory document object model. Then in step 307 each embedded object calls Register( ) on the webpage. In step 308 a portable text representation of the dynamic image of the embedded object is captured. Shown, the portable text representation data is Base64 image data. The Base64 image data is then converted to a native image representation by image processor 304 and stored on the server in step 310. Image processor 304 then returns the location of the image representation on the server to browser emulator 302. In step 312 the embedded object on the in-memory web page document object model is replaced with the image representation. The HTML text and native image representations are then returned to the server and made publicly available for exportation by the user in step 314.

Shown, browser emulator 302 in step 308 captures the image representation of the embedded object on the webpage by invoking the embedded object to rasterize itself. This may be accomplished by calling a public method such as PrintImage( ) which provides Base64 image data representing the current visual representation of the state of the embedded object.

Image processor 304 may convert the portable text representation of image of the embedded object to a portable network graphics (PNG) image, a graphics interchange format (GIF) image, a Joint Photographic Experts Group (JPEG) image, or any image natively supported by a web browser.

Further, image processor 304 may return the URL of the images to the integrated webpage itself. This may occur in the instance of a user request for webpage translation.

Figure 7:
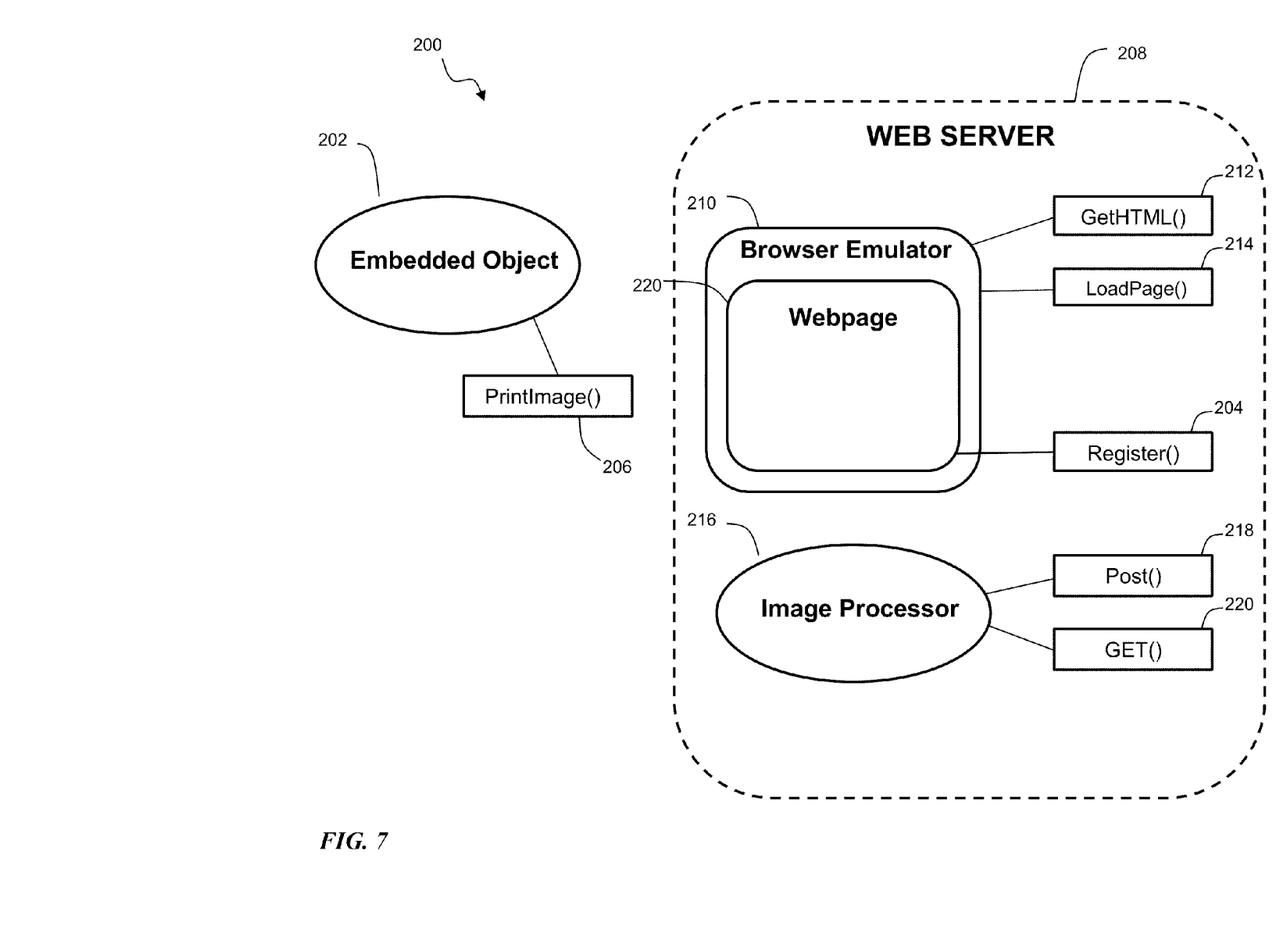
FIG. 7 is a diagram illustrating the implementation framework of one embodiment of the present disclosure.

FIG. 7 illustrates an implementation framework of one embodiment of the present disclosure utilizing a browser emulator object and an image processor service both implemented on a web server operating similarly to FIG. 5, except that image processor 216 includes the method GET( ) 220. GET( ) 220 retrieves the image representation from web server 208 and returns the image representation to browser emulator 210 as the browser emulator replaces the embedded object. In operation, Get( ) 220 retrieves the image representation from web server 208 and streams the data to the integrated webpage loaded as an in-memory browser document object model for rendering. GET( ) 220 may also then delete the retrieved image representation from the server.

Figure 8:
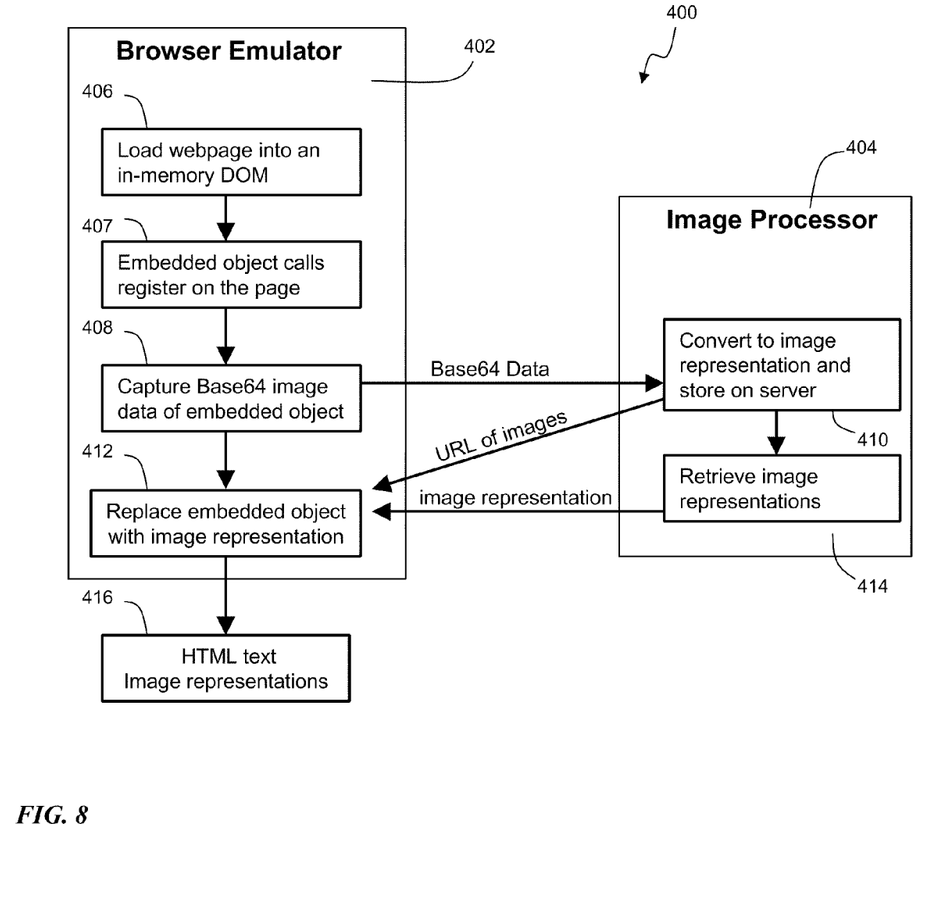
FIG. 8 is a diagram illustrating the functional process of an embodiment of the disclosed subject matter.

FIG. 8 is a diagram illustrating an embodiment of the disclosed subject matter utilizing a browser emulator and image processor implemented on a web server and utilizing the GET method described in FIG. 7. Browser emulator 402 is an in-memory browser implemented on a web server. Image processor 404 is a service implemented on a web server.

Browser emulator 402 may be instantiated according to a call made by a user or automatically to capture the visual representation of a webpage containing an embedded object. In step 406 browser emulator 402 loads the selected webpage into an in-memory document object model. Then in step 407 each embedded object calls Register( ) on the webpage. In step 408 a portable text representation of the dynamic image of the embedded object is captured. Shown, the portable text representation data is Base64 image data. The Base64 image data is then converted to an image representation by image processor 404 and stored on the server in step 410. Image processor 404 then returns the location of the image representation on the server to browser emulator 412. In step 412 the embedded object on the in-memory web page document object model is replaced with the image representation provided by image processor 404. Image processor 404 retrieves the image representation from the server and provides it to the in-memory browser document object model as requested. Image processor 404 then deletes the requested image representation from the server in step 414. The HTML text and image representation is then returned to the server and made publicly available for exportation by the user in step 416.

Figure 9:
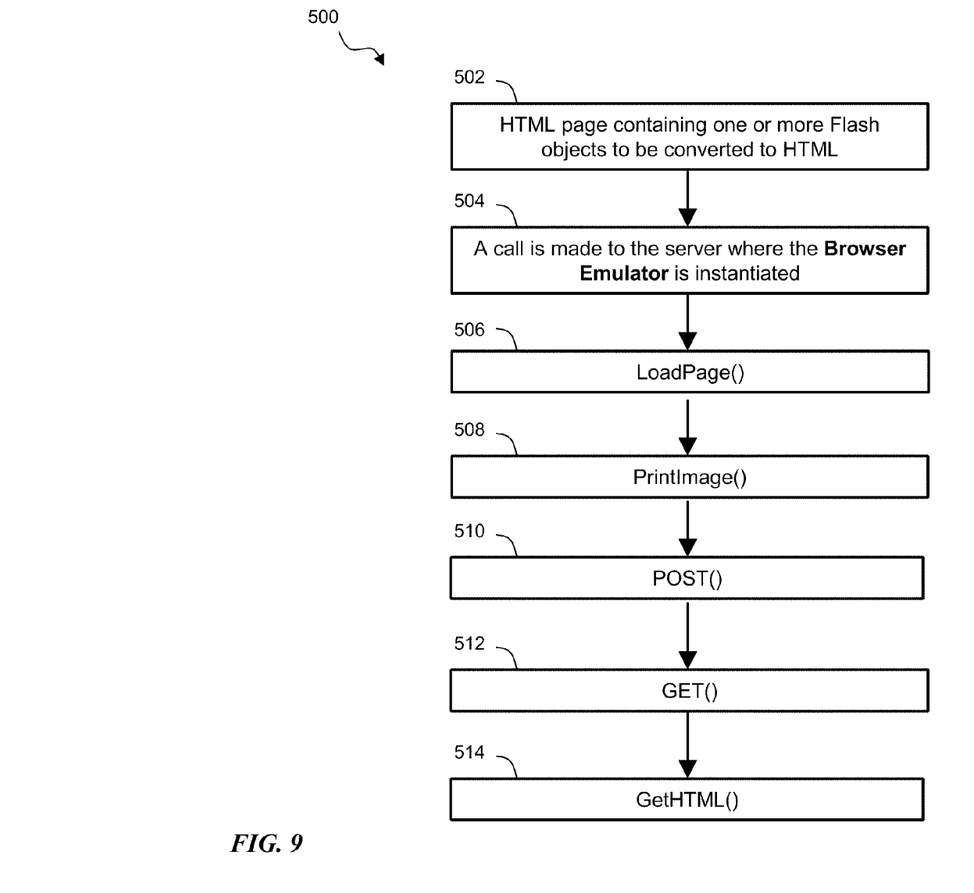
FIG. 9 is a flow chart for transforming a webpage containing an embedded object into native text and image representations according to one embodiment of the present disclosure.

FIG. 9 is a flow chart for transforming the current visual representation of a webpage containing a Flash plug-in into HTML text according to one embodiment of the present disclosure. In step 502 a webpage is selected for transformation. The webpage may be a pre-selected webpage or a webpage selected by a user.

In step 504, a call is made to the server by an automated process or by a user request. The browser emulator may receive a call when a user chooses to capture the current visual representation of a webpage to print by selecting a print button associated with the browser emulator. The browser emulator then instantiates an in-memory browser document object model by calling the LoadPage( ) method. In step 506 the LoadPage( ) method loads the requested webpage in the in-memory browser document object model and polls for JavaScript that signifies when any Flash objects and any other embedded objects that support the PrintImage( ) method are loaded and ready to be printed. This occurs when all the embedded objects have been loaded and call the Register( ) method. Embedded objects that do not support the PrintImage( ) method work as normal and maintain their standard functionality.

In step 508 the browser emulator invokes the JavaScript PrintImage( ) method of each Flash object contained within the HTML page and the Flash object rasterizes itself into Base64 image data. The Base64 image data and corresponding Flash identifiers are then sent to the image processor. In step 510 the image processor converts the posted Base64 image data into PNG images, stores them on the server, and returns the image URL and Flash identifiers to the webpage. Alternatively, step 508 may be performed by the integrated webpage in the same manner it is performed on the client.

In step 512 the JavaScript code replaces all participating OBJECT and EMBED Flash elements within the in-memory HTML page with IMG elements. The IMG elements will then contain SRC attributes which call back to the Image Processor for retrieval and subsequent deletion of the server PNG images. In step 514, the GetHTML( ) method is used to return the resulting HTML to the web server. The images may be stored for a period of time on the server or the browser emulator object may be disposed of to free up system resources dependent on user needs. The resulting HTML text and image representations may then be printed as HTML or converted to a Microsoft Word document or Adobe PDF document.

In operation, the disclosed subject matter transforms the visual representation of the state of an embedded object on an integrated webpage into native image representations. This operation includes capturing an image of the embedded object by invoking the embedded object to rasterize itself into a portable text representation. The portable text representation is then streamed to a web server and converted into a native image representation. The native image representation is then saved on the web server and the embedded object on the webpage is replaced with the native image representation.

Although the disclosed subject matter has been described in detail, it should be understood that various changes, substitutions, and alterations may be made hereto without departing from the spirit and scope of the disclosed subject matter as defined by the appended claims.

What is claimed is:

1. A method for transforming a webpage, the method comprising:
   loading the webpage containing an embedded object in a browser;
   capturing a portable text representation of an image of said embedded object by invoking said embedded object to rasterize itself into said portable text representation;
   streaming said portable text representation to a web server;
   converting said portable text representation into a native image representation on said web server;
   storing said native image representation on said web server;
   generating a uniform resource locator ("URL") identifying a storage location of said native image representation; and
   retrieving said native image representation from said web server using the URL and replacing said embedded object with said native image representation.

2. The method of claim 1, wherein the webpage containing an embedded object is loaded in a web browser.

3. The method of claim 1, wherein the webpage containing an embedded object is loaded into an in-memory browser document object model.

4. The method of claim 3, wherein said loading said webpage into an in-memory browser document object model is executed in response to an automated process.

5. The method of claim 1, wherein said replacing said embedded object with said native image representation further comprises returning said URL of said native image representation stored on said web server to said browser.

6. The method of claim 1, wherein said replacing said embedded object with said native image representation further comprises regenerating said webpage on said web server with said embedded object replaced with said native image representation.

7. The method of claim 1, wherein said portable text representation comprises Base64 image data.

8. The method of claim 1, wherein said capturing a portable text representation of an image of said embedded object is executed in response to a client request.

9. The method of claim 1, wherein said loading a webpage containing an embedded object into a browser further comprises polling said embedded object to determine when said embedded object is loaded.

10. A non-transitory computer-readable medium encoded with a computer-implemented program for transforming a webpage, the program comprising:
    instructions for loading the webpage containing an embedded object in a browser;
    instructions for capturing a portable text representation of an image of said embedded object by invoking said embedded object to rasterize itself into said portable text representation;
    instructions for streaming said portable text representation to a web server;
    instructions for converting said portable text representation into a native image representation on said web server;
    instructions for storing said native image representation on said web server;
    instructions for generating a URL identifying a storage location of said native image representation; and
    instructions for retrieving said native image representation from said web server using the URL and replacing said embedded object with said native image representation stored on said web server.

11. The non-transitory computer-readable medium of claim 10, wherein the webpage containing an embedded object is loaded in a web browser.

12. The non-transitory computer-readable medium of claim 10, wherein the webpage containing an embedded object is loaded into an in-memory browser document object model.

13. The non-transitory computer-readable medium of claim 12, wherein said instructions for loading the webpage into an in-memory browser document object model are executed in response to an automated process.

14. The non-transitory computer-readable medium of claim 10, wherein said instructions for replacing said embedded object with said native image representation further comprise instructions for returning said URL of said native image representation stored on said web server to said browser.

15. The non-transitory computer-readable medium of claim 10, wherein said instructions for replacing said embedded object with said native image representation further comprise instructions for regenerating the webpage on said web server with said embedded object replaced with said native image representation.

16. The non-transitory computer-readable medium of claim 10, wherein said portable text representation comprises Base64 image data.

17. The non-transitory computer-readable medium of claim 10, wherein said embedded object is invoked to rasterize itself by calling a print image method.

18. The non-transitory computer-readable medium of claim 10, wherein said instructions for capturing a portable text representation of an image of said embedded object are executed in response to a client request.

19. The non-transitory computer-readable medium of claim 10, wherein said instructions for loading the webpage containing an embedded object into a browser further comprise instructions for polling said embedded object to determine when said embedded object is loaded.

20. A server comprising a non-transitory computer-readable medium encoded with a program for transforming a webpage, the program comprising instructions for:
- instantiating an in-memory browser document object model on a server;
- loading the webpage containing an embedded object into said in-memory browser document object model;
- capturing a portable text representation of an image of said embedded object, wherein said capturing comprises invoking said embedded object to rasterize itself into said portable text representation;
- converting said portable text representation into an image representation;
- storing said image representation on said server;
- generating a URL identifying a storage location of said image representation; and
- replacing said embedded object in said in-memory browser document object model with said image representation using the URL.

21. A method for transforming a webpage, the method comprising:
- loading the webpage containing an embedded object in a browser;
- capturing a portable text representation of an image of said embedded object, wherein said capturing comprises invoking said embedded object to rasterize itself into said portable text representation;
- sending said portable text representation to an image processor;
- receiving a URL identifying a storage location of a native image representation from the image processor; and
- replacing said embedded object with said native image representation using said URL;
- wherein said native image representation comprises a conversion of said portable text representation.

22. A non-transitory computer-readable medium encoded with a computer-implemented program for transforming a webpage, the program comprising:
- instructions for loading the webpage containing an embedded object in a browser;
- instructions for capturing a portable text representation of an image of said embedded object, wherein said instructions for capturing comprises instructions for invoking said embedded object to rasterize itself into said portable text representation
- instructions for sending said portable text representation to an image processor;
- instructions for receiving a URL identifying a storage location of a native image representation from the image processor; and
- instructions for replacing said embedded object with said native image representation using said URL;
- wherein said native image representation comprises a conversion of said portable text representation.

23. A server comprising a non-transitory computer-readable medium encoded with a program for transforming a webpage, the program comprising instructions for:
- loading the webpage containing an embedded object in a browser;
- capturing a portable text representation of an image of said embedded object, wherein said capturing comprises invoking said embedded object to rasterize itself into said portable text representation
- sending said portable text representation to an image processor;
- receiving a URL identifying a storage location of a native image representation from the image processor; and
- replacing said embedded object with said native image representation using said URL;
- wherein said native image representation comprises a conversion of said portable text representation.

* * * * *